April 27, 1937.    W. E. SMITH    2,078,694
AUTOMATIC FEEDING MECHANISM
Filed Oct. 3, 1935    5 Sheets-Sheet 1

INVENTOR
WILLIAM E. SMITH
BY
Louis W. Helmuth
ATTORNEY

April 27, 1937.  W. E. SMITH  2,078,694
AUTOMATIC FEEDING MECHANISM
Filed Oct. 3, 1935   5 Sheets-Sheet 2

INVENTOR
WILLIAM E. SMITH
BY
ATTORNEY

April 27, 1937.  W. E. SMITH  2,078,694
AUTOMATIC FEEDING MECHANISM
Filed Oct. 3, 1935  5 Sheets-Sheet 4

Fig. 8

INVENTOR
WILLIAM E SMITH
BY
ATTORNEY

April 27, 1937.   W. E. SMITH   2,078,694
AUTOMATIC FEEDING MECHANISM
Filed Oct. 3, 1935   5 Sheets-Sheet 5

INVENTOR
WILLIAM E. SMITH
BY
Louis W. Elmut
ATTORNEY

Patented Apr. 27, 1937

2,078,694

UNITED STATES PATENT OFFICE 2,078,694

AUTOMATIC FEEDING MECHANISM

William E. Smith, Detroit, Mich., assignor to The Midland Steel Products Company, Cleveland, Ohio, a corporation of Ohio Application October 3, 1935, Serial No. 43,393

11 Claims. (Cl. 219—4)

This invention relates to new and useful improvements in welding machines and an important object of the invention resides in the provision of means for automatically feeding magnetic articles one by one over a transformer and through a magnetic field to a point in proper position between two welding electrodes without causing interference with the electrical devices or the automatic feed of the articles.

Another important object of the invention is to locate the welding transformer in such position that the stationary electrode or die of the welding equipment can be attached directly to a pole of the transformer in alignment with a reciprocatory welding electrode.

Another important object of the invention is to provide means for feeding and shielding the devices to be welded from a hopper having unarranged work pieces to a point to where the devices are to be welded to work in proper position to be immediately welded without manual handling in any respect whatsoever from the time the devices are dumped into the hopper until they have been welded to the work.

Another object of the invention is to provide an automatic feeder including a reciprocatory shielded shuttle operated from the mechanism which actuates the reciprocatory electrode; to which shuttle, an oscillatory transfer device feeds the devices one at a time from a gravity operating slide or chute which positions the devices right side up for welding.

Another object of the invention is to provide the feeding mechanism with a work lifter which automatically lifts the work with the devices welded thereto after each welding operation in order to preclude an operator from welding two devices to the same spot and to facilitate rapidity of operation of the machine.

Still another object of the invention is to provide a hopper into which unarranged work pieces are dumped and which will automatically position the work pieces in rows and deliver them to the chute, there being provided trip mechanism which assures the chute being maintained full of the devices arranged in proper position by means of the automatic engagement of means for turning the hopper on its axis whenever the upper end of the chute becomes empty.

A further object of the invention is to provide sorting means associated with the upper end of the chute for removing therefrom improperly positioned devices and returning them to the hopper for proper disposition.

Other objects and advantages of the invention will become apparent during the course of the following description.

In the accompanying drawings forming a part of the application and wherein like numerals are employed to designate like parts throughout the several views.

Unlike most automatic feed mechanisms for various kinds of machines, in which the feeding mechanism can have no adverse effects upon the machinery it feeds or vice versa, the present invention involves these considerations, because of the delicate projection welding performed by the welding machine which must not be adversely affected by either the articles or the mechanism which automatically feeds them to be welded, also the feeding mechanism and articles fed thereto must be shielded against magnetic influences. In addition, the welding machine itself must be constructed to avoid power losses in the transmission of electrical current to the welding electrodes whereby the requisite electrical energy may be effective instantly to perform spot or projection welding.

With this prime consideration in view, the welding transformer and its poles are constructed and arranged whereby electrical energy is conveyed from one to the other through the shortest possible path and the feeding mechanism which conveys magnetic articles to a point between the electrodes is constructed and arranged to effect the least possible electrical interference with the welding equipment and articles by keeping all magnetizable material as far away from the electrodes as is possible while at the same time providing for the most compact arrangement of mechanisms. Therefore, one of the prime objects of the invention is to shield the welding equipment from all magnetic parts including the articles automatically fed thereto so there will be no adverse effects upon the welding potentiality of the equipment or the free feed of the articles thereto.

Briefly, the apparatus is designed for welding steel clinch nuts N to various articles such as brackets and side rails of automobile frames and consists briefly of a rotatable nut feeding hopper A into which is dumped a quantity of unarranged nuts N. This hopper feeds the nuts to a downwardly inclined chute C from which a sorting device D removes improperly disposed nuts and transfers them back into the hopper to be again fed to the chute. This open sided chute C is given a turn or twist intermediate its ends through 180 degrees to dispose the open side of the chute at the underside of its lower end to further shield the steel nuts from the magnetic field adjacent the transformer and electrodes. The nuts are transferred from the chute to the shuttle E by a transfer mechanism F and are fed one by one between the electrodes H upon each separation thereof. It will be noted that the nuts are fed through a shielded shuttle mechanism to prevent their being influenced by magnetic fields to clog the shuttle or from influencing the action of the electrodes. During each separation of the electrodes H, a work lifter G is automatically moved vertically to lift the work with the nut welded thereto from the lower electrode.

The hopper A is rotatably mounted upon a bearing ring 1 bolted to the upper end of an upwardly inclined pedestal 2 which is fastened at its lower end to the side of a welding machine W. This causes the hopper to be disposed at an oblique angle with respect to the side of the welding machine with the upper open end of the hopper facing outwardly from the side of the machine and rearwardly thereof. The inner wall 4 of the hopper is in the shape of a truncated cone which is supported by an annular casting 5 bolted to a bearing ring which is rotatably mounted on the bearing 1 and has secured thereto and also mounted on the bearing 1, a ratchet ring 7 having peripheral teeth 8 for engagement with a mechanism which turns the hopper through the distance of one tooth each time the upper end of the chute C is devoid of nuts. The wall 4 of the hopper meets a wall 9 of the mouth at an angle to provide capacity for a large number of unarranged nuts. The bearing ring 1 is formed with an integral enclosed slide 10 inclined downwardly to the lower portion of the hopper and into this slide extends and is attached thereto the upper open sided end of chute C so that nuts improperly positioned in the chute may be sorted out of the same by means of a continuously rotated sorting knurled wheel D which moves through the circular path indicated by the dot and dash lines of Figs. 5 and 6 to engage only those nuts having their locating bosses 11, disposed uppermost in the chute so as to be engaged with the sorting wheel and thereby removed from the upper end of the chute to be returned to the hopper by means of the slide 10.

Figures 3, 4, 5, 6, 7:
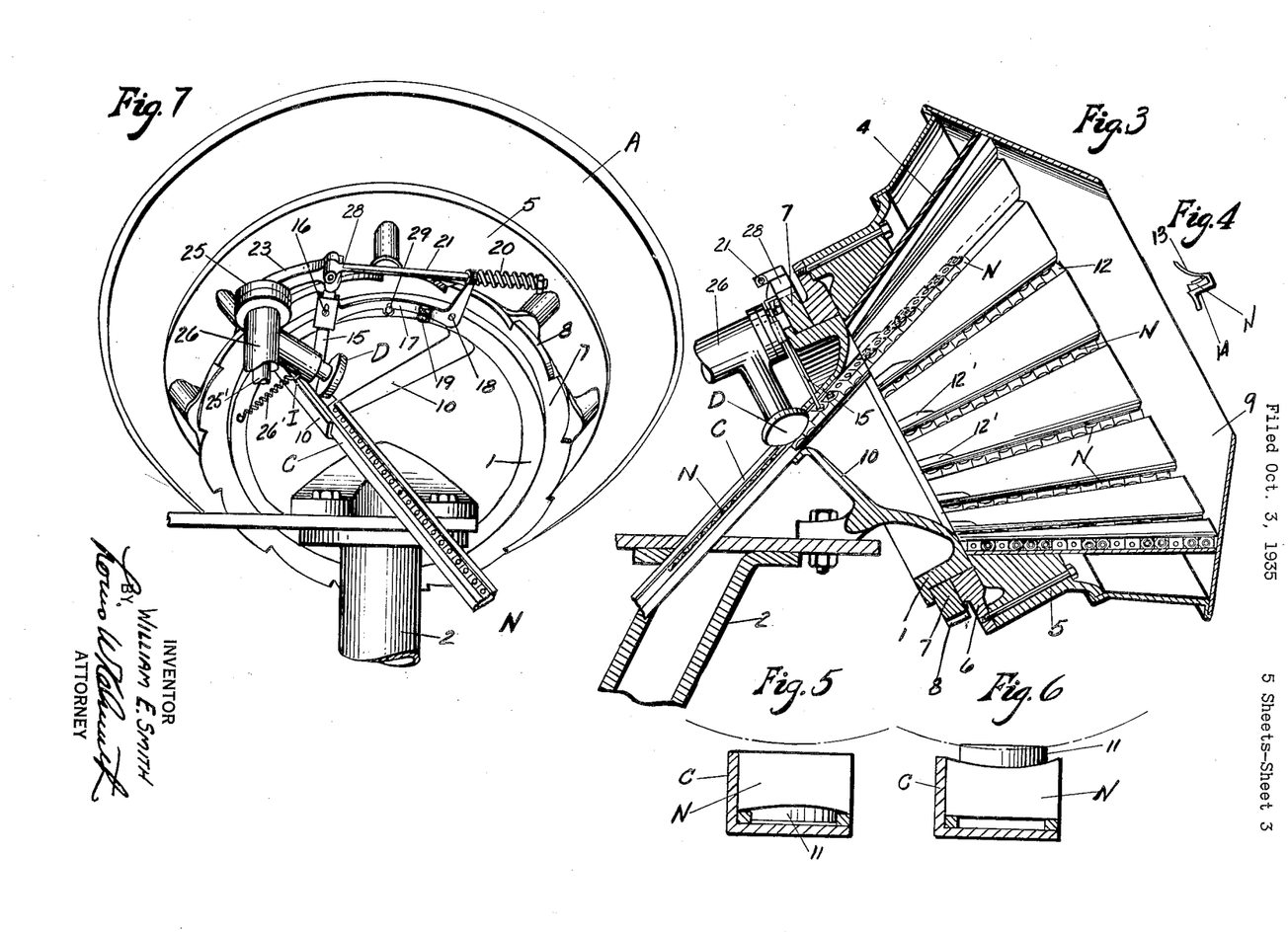
Fig. 3 is an enlarged vertical section taken through the feeding hopper.
Fig. 4 is an enlarged transverse section through a section of the hopper illustrating one of the grooves into which the unarranged devices in the hopper fall.
Fig. 5 is an enlarged transverse section of the upper end of the chute at the point where the sorting device is arranged and illustrating a device properly positioned in the chute.
Fig. 6 is a similar section showing a device improperly positioned in the chute and in a position to be kicked into the hopper by the sorting device.
Fig. 7 is a rear elevation of the back of the hopper illustrating the mechanism for periodically operating the same.

The wall 4 of the hopper is provided with a plurality of circumferentially spaced grooves radiating from the apex of the truncated conical wall 4 to be brought successively into direct alignment with the upper end of the chute C and stopped by the relation of ratchet teeth 8 thereto, so that all nuts in each groove will slide by gravity into the upper end of the chute, as best appreciated from Fig. 3. Fig. 4 shows a section of one of these grooves in which the leading wall 13 is inclined to induce the nuts to tumble into the groove, while the trailing wall 14 of each groove is normal to the annular wall 4 to provide a ledge insuring that the nuts lodged therein are carried upwardly upon counter-clockwise turning of the hopper to become aligned with the upper end of the chute as hereinbefore explained. The leading edge of the end 12' of each groove nearest the apex of the cone is enlarged to induce the nuts into the groove. Of course, these grooves are of sufficient size to receive various size nuts or the sides of the grooves may be provided with adjustable plates or removable plates interchangeable with others to adapt the grooves to receive various size and shaped nuts.

The hopper is not continuously rotated but is only turned a partial revolution equal to the distance between a pair of grooves 12 whenever the upper end of the chute C is devoid of a supply of nuts. This operation is controlled by a vertically movable trip 15 which is spring projected upon the upper sides of the nuts passing through the open upper end of chute C, serving as a feeder, as it were to automatically throw into operation the mechanism for turning the drum whenever the upper end of the chute is devoid of nuts. This assures a constant supply of nuts to the chute as long as there is a supply in the hopper A. This trip 15 is adjustably connected as at 16 to the extremity of one arm of a bell crank 17 fulcrumed as at 18 on the flange of bearing ring 1. A compression spring 19 is interposed between the long arm of bell crank 17 and a lug formed on bearing ring 1 so as to balance the bell crank more or less against the compression spring 20 mounted on pawl rod 21 between a shorter arm 22 of bell crank 17 and an abutment carried by the free end of the rod 21. The pawl rod 21 extends through arm 22 and the other end of the rod 21 is pivotally connected to the free end of a gravity pawl 23 which has its other end eccentrically mounted as at 24 on a disc 25 keyed to a drive shaft 25' mounted in casing 26 extending toward the welding machine and mounted for turning about its axis. This casing is urged by a spring 26' to urge its extension I carrying the shaft of sorting wheel D downwardly so that the tapered sorting wheel is yieldingly held against the nuts entering the chute. This shaft 25' is continuously driven by an auxiliary electric motor 27 mounted in any suitable place on the welding machine and suitable gearing is arranged between shaft 25' and the shaft of the knurled sorting wheel D. Due to the mounting of this pawl 23, its natural tendency is to be lowered by gravity to seek seating against one of the ratchet teeth 8, but normally is held disengaged therefrom by its cam surface 28 riding on the upper end of trip 15. In order to limit the oscillation of the trip arm 17, a stop 29 extends from the bearing ring I and operates in a slot of arm 17.

Figure 8:
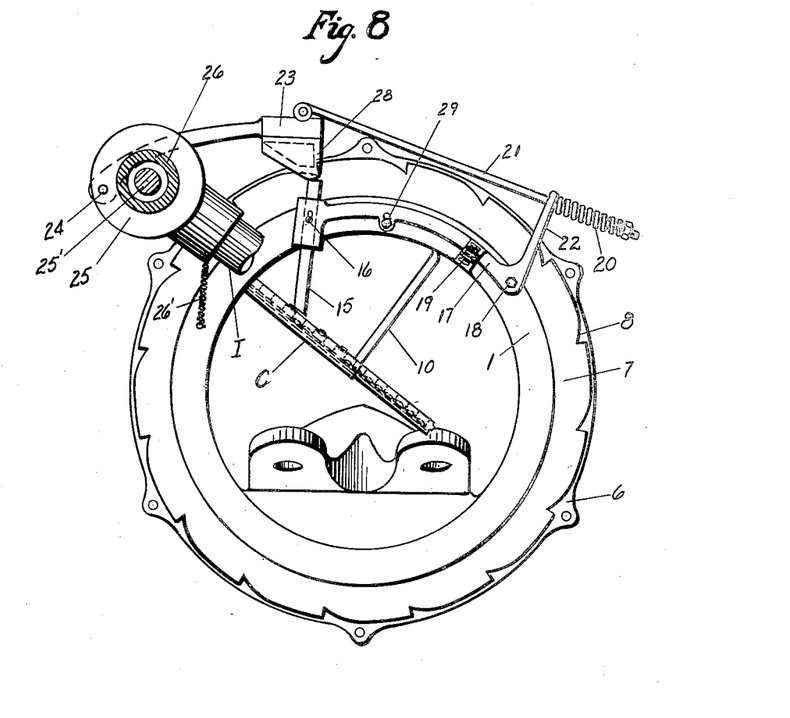
Fig. 8 is an enlarged elevation of the trip mechanism for automatically throwing into operation the pawl and ratchet mechanism for turning the hopper.

From the foregoing, it will be appreciated that whenever the upper end of chute C is empty, the trip bar 15 will move downwardly and thereby lower the continually reciprocating pawl 23 into such position that it will drop behind a tooth 8 and upon its next clockwise movement will cause corresponding movement of ratchet ring 7 and consequently the hopper A as viewed in Fig. 8. The spring 20 causes the rod 21 to yieldingly swing the bellcrank so that the trip 15 is yieldingly forced into the chute whenever it is empty and rod 21 moves to the left of Figs. 7 and 8. When the rod 21 is removed to the right, the trip 15 is free to be moved up out of the path of the nuts. Due to the limited throw of the pawl 23 the hopper will only be moved through a distance equal to the space between a pair of grooves 12 so as to dispose the next groove 12 in alignment with the upper end of the chute whereby the nuts in said groove automatically feed by gravity into the upper end of the chute and slide under the trip bar 15 which will hold the pawl 23 disengaged from the ratchet to stop movement of the hopper until the upper end of the chute again becomes empty.

As best appreciated from Figs. 5, 6, 11 and 12, each nut is provided on one face with an axially extending boss or pilot 11 surrounding which and extending in the same direction are triangular welding projections formed at the four corners of the nut. Those nuts which enter the upper end of the chute in the position shown in Fig. 6 with the pilot 11 up will be disposed in the path of movement of the sorting wheel D and therefore will be kicked out of the chute back into the hopper as hereinbefore explained. Therefore only those nuts disposed as in Fig. 5 will pass the sorting wheel, but it is necessary to have all of the nuts, when fed into the welding machine, disposed with the pilots 11 uppermost as shown in Fig. 6 to locate the work thereon. In addition, the major length of the chute C is of channel cross section with an opening extending lengthwise thereof in order that the operator may determine whether the nuts are properly feeding therethrough, at all times. In order to shield these steel nuts insofar as is possible from being influenced by the magnetic field of the transformer and electrodes, the intermediate portion of the downwardly inclined chute C is twisted through 180 degrees so that the imperforate bottom of the chute is disposed uppermost at its lower end as clearly shown in Figs. 1 and 2. This lower end of the chute feeds by gravity into a transfer and shuttle mechanism which will be presently described.

Figures 2, 2A:
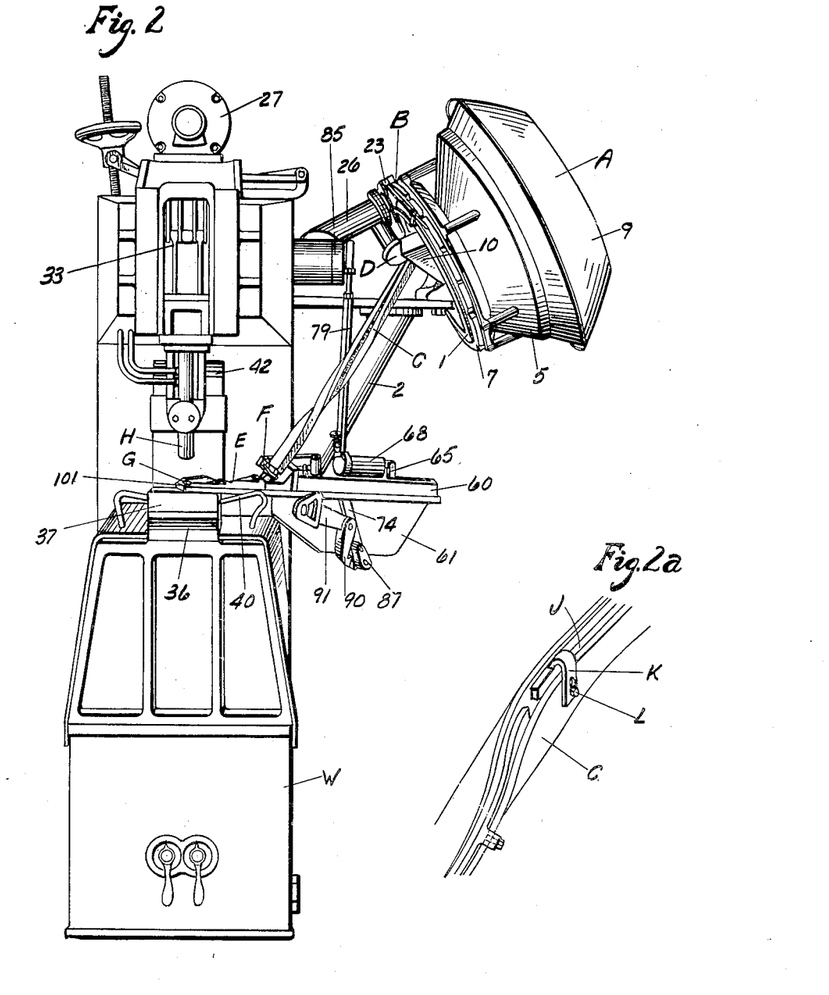
Fig. 2 is a front elevation of the welding machine.
Fig. 2a is an enlarged perspective view of part of the chute showing the adjustable closure therefor.

To close the channel of the brass chute C and to render it adaptable to feed various size nuts, an adjustable brass closure strip J made in one piece or sections, is curved to conform to the twist of the chute to fit in the open channel as shown in Fig. 2a. This closure is formed with integral slotted lugs K adjustably fastened to the side of the chute with screws L entering threaded openings therein.

Figures 1, 1A:
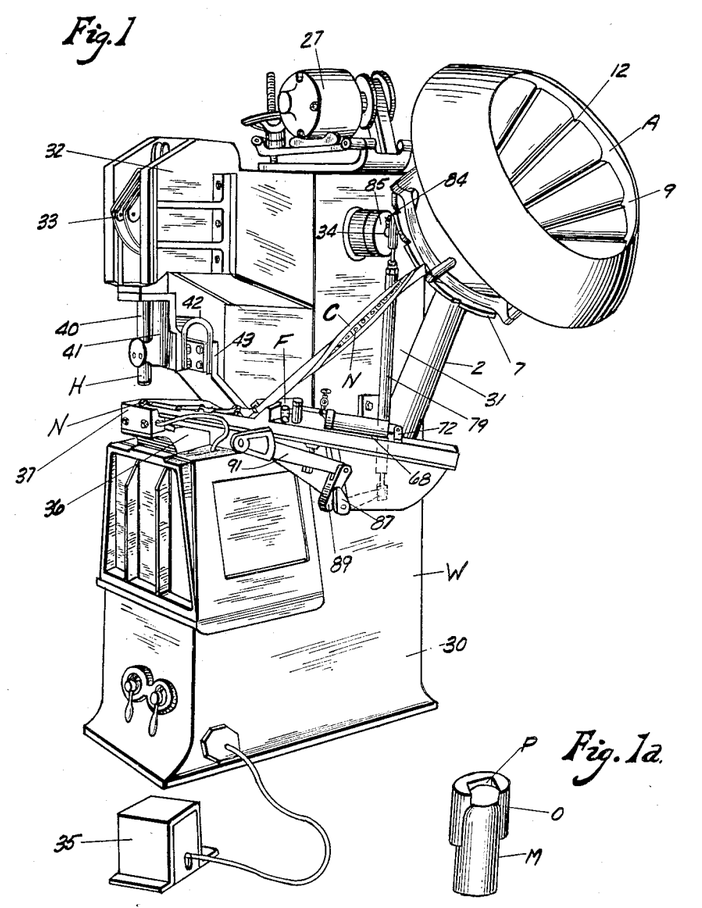
Fig. 1 is a perspective view of the welding machine with the automatic feeder applied thereto.
Fig. 1a is a perspective view of a modified form of stationary electrode.

The welding machine W is built generally on the order of a punch press having a base 30, upright 31 and overhanging head portion 32 which overhangs the bed of the machine to house a toggle mechanism 33 actuated by the usual horizontal crankshaft 34 which is caused to make a complete revolution each time the treadle mechanism 35 is depressed by the operator. Within the forward portion of the base is mounted a welding transformer having one core leg 36 of the secondary extended upwardly to form the bed of the machine and to which a lower stationary electrode 37 is secured. This electrode 37 is provided with an upwardly extending right angular pocket 38 of magnetizable material which is magnetically energized by the transformer and is adapted to closely fit the two sides of a nut fed thereto by the shuttle mechanism and to magnetically attract the nut into the pocket as it is advanced by the shuttle. Secured to the top of the electrode in abutting relation with the extension 38 to cover the upper portion of the stationary electrode is a copper plate 39. This stationary electrode is water cooled by circulating coolant through its hollow body by means of pipes 40. If desired the stationary electrode may assume the form of an upstanding post M as illustrated in Fig. 1a with a magnetic cap O having a polygonal recess P to receive and position a nut fed from the shuttle, in welding position upon the top of post M.

Reciprocably mounted directly above the stationary electrode is a movable electrode 40 operated by the toggle 33 each time the welding machine is energized so as to descend upon a plate having a perforation to receive the boss 11 of nut N in pocket 38 to complete the circuit therethrough and cause fusion of the corner projections of the nut with the plate. The reciprocatory carrier 41 for the upper movable electrode is connected by relatively short buss plates 42 to an upward extension 43 of one leg of the transformer core so as to reduce current losses by directing the current in the shortest possible path from electrode to electrode. The stationary electrode is of course connected to the other leg of the transformer core.

In order to automatically feed the nuts one by one to the extension or die 38 in position to be welded with each reciprocation of the movable electrode, the shuttle mechanism E is arranged at one side of the welding machine in downwardly and rearwardly inclined position so that the nuts after being delivered to the shuttle by the transfer mechanism F are fed uphill to the welding die. The body 45 of the shuttle mechanism is constructed of non-magnetic material such as brass or copper and is provided with a longitudinally extending groove 46 through which the nuts of various sizes are successively fed. Reciprocably mounted in this groove is a non-magnetic shuttle bar 47 having its top surface provided with a step formation to provide a pair of longitudinally spaced shoulders 48 and 49, adapted to successively engage the side of a nut to feed it step by step toward the welding electrodes. The rest position of the shuttle bar 47 is shown in order to illustrate the relative positions of the nuts where they are transferred from one step to the next during the retractile movement of the shuttle to points to dispose these shoulders behind these relative positions of the nuts. The shuttle casing is provided with a pair of spring pressed pawls 50 having their free ends engaged with the nuts and approximately flush with the shoulders 48 and 49. The pivoted end of each pawl 50 is bifurcated and apertured to receive a pivot pin with a coiled tension spring positioned on the pin with one end engaging the top of the pawl and its other end fixed in the shuttle casing so as to normally urge the pawl into yielding engagement with the shuttle bar. In order to limit pressure of these pawls on the shuttle bar, each pawl is provided at each side with a laterally extending projection 51 adapted to rest upon the upper side edges of the shuttle casing. Immediately forward of the free end of each pawl 50, and spanning the groove 46 is a non-magnetic shield plate S so as to shield the nuts against magnetic influences in their positions of rest.

Just rearward of the innermost pawl 50 one side of the shuttle casing is provided with an inwardly and downwardly inclined surface 52 which intersects a downwardly and outwardly inclined surface 53 to provide a V-shaped pocket on one side of the shuttle casing for the support of the lower end of chute C whereby the nuts will be successively fed by gravity to the bottom of this V-shaped pocket at one side of the groove 46 above the shuttle bar to be moved by the transfer mechanism into the longitudinal groove in the shuttle casing. Spanning this pocket and adjacent portion of groove 46 is a non-magnetic shield T shown in dotted lines in Fig. 10.

Figures 9, 10, 11, 12:
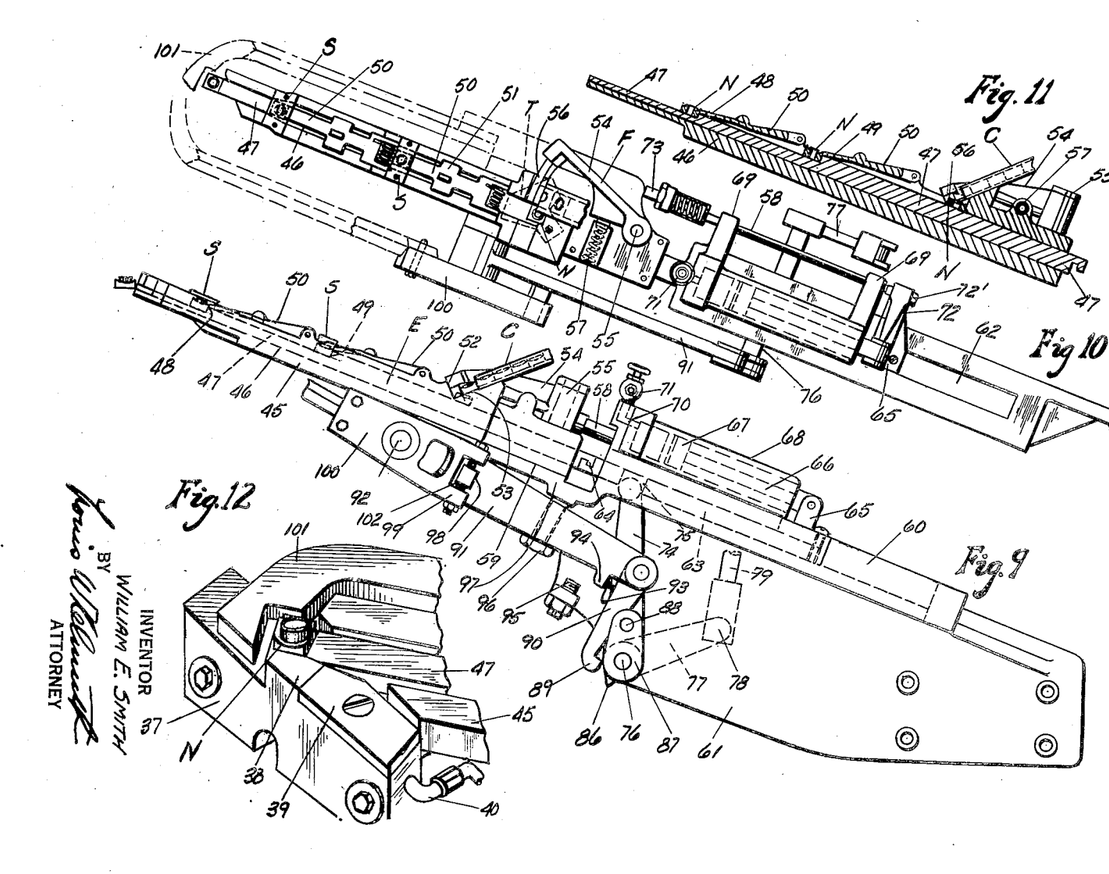
Fig. 9 is a side elevation of the shuttle mechanism for feeding the devices between the electrodes.
Fig. 10 is a top plan of the same.
Fig. 11 is an enlarged longitudinal section of the forward end thereof.
Fig. 12 is an enlarged perspective view illustrating the integral receiving pocket formed on the secondary electrode with the forward end of the shuttle shown cooperating therewith and the forward end of the work lifter.
Figure 13:
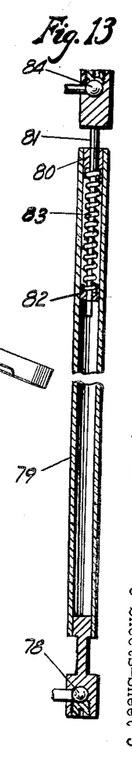
Fig. 13 is an enlarged longitudinal section of the pitman connection between the electrode actuating mechanism and the shuttle actuating mechanism.

To effect this transfer of nuts from the chute to the shuttle, a transfer arm 54 is pivoted as at 55 to the rear end of the shuttle casing and its free end is provided with an arcuate finger 56 which traverses the V-shaped pocket 52 and is normally disposed therein as shown in Fig. 10. During the operation of the shuttle mechanism and during each forward stroke of the shuttle bar, the finger 56 engages the lowermost nut from the chute and moves it laterally over into the groove 46 where it falls from its inclined position to a point of rest on its flat bottom. The transfer arm 54 is normally urged to move its finger 56 out of the pocket 52 by means of a tension coil spring 57 mounted in a pocket on the shuttle and engaging an extension of the arm 54. However, the finger 56 is normally retained in the pocket 52 by reason of the engagement of a push rod 58 with the heel of the pawl 54.

The shuttle casing is mounted rigidly on a base piece 59 which extends rearwardly in the form of a table 60 and a web portion 61 suitably fastened to the side of the welding machine. The table 60 is provided with a longitudinally extending way or groove 62 in which is reciprocably mounted the rear section 63 of shuttle bar 47. The forward end of section 63 is coupled to the complementary forward section by a detachable coupling device 64 on the order of a mortise and tenon joint. A slide 65 is secured to the rear end of section 63 with rod 66 of piston 67 operating in cylinder 68 fixed to the table and having lateral extensions 69 at its ends to form a guide for the reciprocable rod 58. The forward end of the cylinder is provided with a port 70 communicatable with the atmosphere in varying degrees by means of an adjustable valve 71 so that the speed of movement of piston 67 can be controlled by regulating this valve. The slide 65 is provided with a lateral extension 72 carrying an adjustable screw 72' to abut the rear end of rod 58.

The piston and shuttle bar are reciprocated by an oscillatory arm 74 having its upper end operating in a slot 75 in shuttle section 63. The lower end of this arm 74 is keyed to an operating shaft 76 journaled in bearings in the web portion 61 and extending beyond the opposite side of the web to be keyed to an oscillatory arm 77, the free end of which is connected by a ball and socket joint 78 to the lower end of a yielding pitman rod 79. This rod consists of a tube having its upper end provided with a guide 80 for telescopically receiving a rod section 81 having an abutment 82 for engagement with one end of a loaded compression coil spring 83 mounted upon rod section 81 and abutting the guide 80 at its upper end whereby the pitman will yield to prevent damage to the operating mechanism in event the shuttle mechanism becomes jammed. The upper end of rod 81 is provided with a ball and socket connection 84 eccentrically with a disk 85 keyed to the drive shaft of the welding machine. From this construction, it will be clear that upon the downstroke of pitman 79, lever 74 will be rocked to the right of Fig. 9 thereby retracting the shuttle so that shoulder 49 thereof will be disposed behind the nut just entered in the shuttle groove by the transfer finger 56, and shoulder 48 will be retracted to the original position of shoulder 49 to be arranged behind the nut being held from retrograde movement by the innermost pawl 50. At the same time, the free end of the shuttle bar will move behind the nut held against retrograde movement by the outermost pawl 50 to be in position to be moved up to the welding die 38 on the next forward stroke of the shuttle which occurs when the pitman moves upwardly through the other half of its cycle represented by one revolution of eccentric 85 each time the treadle 35 is operated to cause one revolution of the crankshaft 34 and consequently one cycle of movement of the upper movable electrode 40 so that it comes to rest in its raised position shown in Fig. 1 after having been moved downwardly to complete the welding circuit through the nut. It will therefore be seen that the movable electrode 40 and pitman 79 operate substantially in step.

During elevation of the electrode 40, it is desirable to cause automatic lifting of the work with the nut welded thereto so as to vacate the nut die 38 on the stationary electrode waiting to receive the next successive nut as it is being moved forwardly by the shuttle mechanism and attracted into the die. For this purpose, a ratchet tooth 86 is formed on a trip member 87 keyed to shaft 76 to rotate therewith. This trip link at its upper end is provided with a laterally extending trip pin 88 which is adapted to release shoulder 89 of pawl 90 from engagement with the tooth 86 after the pawl has been swung down to raise the work lifter. This action occurs after the downward movement of pitman 79 has positioned the ratchet tooth 86 above the shoulder 89 of pawl 90 and the tooth has been turned counterclockwise to a certain degree by the upstroke of pitman 79 thereby moving pawl 90 downwardly. This pawl is pivotally connected to the free end of lever 91 pivoted at its other end to a shaft 92 extending laterally through the shuttle support 59. In order to retain the pawl 90 in position to become latched with tooth 86, on the downstroke of the pitman, a spring 93 is interposed between the pawl 90 and a lug 94 formed on lever 91. Downward swinging movement of lever 91 is limited by an adjustable stop 95 and movement in the opposite direction is limited by an adjustable stop 96 engaging an abutment 97 on the shuttle support 59.

For operating the work lifter, the lever 91 is provided intermediate its ends with a lateral extension 98 adapted to operate between spaced arms 99 of a work lifting lever 100 also fulcrumed on shaft 92 and having its forward end 101 constructed of non-magnetic material and shaped to fit about the nut in electrode die 38. Screws 102 are disposed between the arms 99 and the lateral extension 98 to provide for adjustments of the work lifter 101 which is moved upwardly each time the pitman 79 moves upwardly and the ratchet tooth 86 pulls the pawl 90 downwardly. As indicated in Fig. 10 this work lifter may be mounted on either side of the shuttle support, depending upon which is the most convenient place determined by the character of the work to be accomplished by the welding machine. Figs. 1 and 2 show the work lifter arranged along the inner side of the shuttle mechanism whereas Fig. 9 shows it set up along the outside of the shuttle while Fig. 10 shows both alternatives.

Recapitulating briefly the cooperative relation of the shuttle and electrodes, it will be appreciated from the foregoing description that as the upper movable electrode is driven down against the work, the shuttle 47 has been retraced so that the free end of the shuttle moves back to the normal position of shoulder 48 to engage behind the nut nearest the electrode so as to project the same forwardly into the welding die 38 as the upper electrode retracts to its upward position. The transfer finger 56 is normally disposed in the pocket 52 and in the path of movement of the lowermost nut coming out of the chute C so that this nut is not fed into the shuttle groove until the shuttle moves rearwardly and the finger 56 again enters the pocket to move across the same and eject this nut into the shuttle groove upon the forward movement of the shuttle. This nut is picked up by the shoulder 49 in the next projecting movement of the shuttle and advanced to a point just beyond the innermost latch 50 as the shuttle completes the cycle, to be held in such position by the latch until the next successive shoulder 48 comes back to engage and advance the nut another step through the shuttle mechanism. It will be obvious from the construction hereinbefore explained that the steel nuts are retained covered by the shuttle mechanism until they are adjacent their final position for welding.

It is to be understood that various changes in the size, shape and arrangement of parts may be resorted to without departing from the spirit of the invention or the scope of the appended claims.

I claim:

1. In a welding machine having relatively movable electrodes to which work is fed, means for relatively moving the electrodes to contact an interposed work piece, the combination of work feeding means synchronized with said means and being separate from the electrodes to feed a work piece between said electrodes upon each separation thereof, a work lifter, and a trip connection between the feeding means and work lifter to operate the latter after each separation of the electrodes.

2. In a welding machine, a transformer creating a magnetic field, a fixed electrode mounted on said transformer and having a magnetizable portion magnetized by the transformer field to magnetically attract articles to said fixed electrode, a movable electrode movable relatively to said fixed electrode, feeding mechanism terminating adjacent said fixed electrode and operable to feed said magnetizable articles to a point adjacent said fixed electrode, said magnetized portion of said fixed electrode operating to magnetically attract said magnetizable articles from said point to said fixed electrode, and means for operating said feeding mechanism and said movable electrode.

3. In a welding machine, a transformer creating a magnetic field, a fixed electrode mounted on said transformer and having a magnetizable portion magnetized by the transformer field to magnetically attract articles to said fixed electrode, a movable electrode movable relatively to said fixed electrode, feeding mechanism having a portion disposed in the magnetic field of said transformer and terminating at a point adjacent said fixed electrode, said feeding mechanism having the portion disposed in said magnetic field composed of substantially non-magnetizable material to facilitate feeding of the magnetizable article through said magnetic field to said point adjacent said electrode, said magnetized portion of said fixed electrode operating to magnetically attract said magnetizable articles from said point to said fixed electrode, and means for operating said feeding mechanism and said movable electrode.

4. In a welding machine, a transformer having one leg of its core disposed at the front of the welding machine and having a rear leg disposed rearwardly with respect to said front leg, an electrode mounted on said front leg at the front of the welding machine, said machine having a portion overhanging said transformer, a vertically reciprocable electrode carried by said overhanging portion and disposed in vertical alignment with said fixed electrode, buss means overhanging the legs of said transformer and extending rearwardly from said upper electrode to said rear transformer leg, the relative positions of said electrodes, transformer legs and buss means defining a working recess, the opening of which is disposed at the front of said transformer between said electrodes, elongated work feeding means extending from said fixed electrode in a downward and rearward direction along one side of said welding machine from the front thereof, and means for operating said movable electrode and said feeding means to feed work upon the stationary electrode each time the movable electrode is elevated.

5. In a welding machine, a transformer having one leg of its core disposed at the extreme front of the welding machine and having a rear leg disposed rearwardly with respect to said front leg, an electrode mounted on said front leg at the extreme front of the welding machine, said machine having a portion overhanging said transformer, a reciprocable electrode carried by said overhanging portion and disposed in alignment with said lower electrode, buss means extending rearwardly from said upper electrode to said rear transformer leg, the relative positions of said electrodes, transformer legs and buss means defining a working recess the opening of which is disposed at the front of said transformer between said electrodes, and means for operating said electrodes with respect to each other.

6. In a welding machine, a transformer having one leg of its core disposed at the front of the welding machine and having a rear leg disposed rearwardly with respect to said front leg, an electrode mounted on said front leg at the front of the welding machine, said machine having a portion overhanging said transformer, a vertically reciprocable electrode carried by said overhanging portion and disposed in vertical alignment with said fixed electrode, buss means overhanging the legs of said transformer and extending rearwardly from said upper electrode to said rear transformer leg, the relative positions of said electrodes, transformer legs and buss means defining a working recess, the opening of which is disposed at the front of said transformer between said electrodes, elongated work feeding means extending from said fixed electrode along one side of said welding machine from the front thereof, and means for operating said movable electrode and said feeding means to feed work upon the stationary electrode each time the movable electrode is elevated.

7. In a welding machine, a transformer, a magnetizable work supporting electrode disposed in position to be magnetized by the field of said transformer, the combination of a non-magnetizable work feeding means terminating within the effective field of said electrode for delivering magnetizable work pieces thereto, whereby "freezing" of the work to the feeder is prevented.

8. In a welding machine including an electric transformer and welding electrodes operably connected thereto, the combination of means for feeding magnetizable work to said electrodes, said work feeding means having portions thereof disposed within the effective field of said transformer, and means for shielding the work fed to said electrode from the effects of said field whereby to prevent "freezing" of said work to said feed means.

9. In a welding machine, a transformer, a magnetizable work supporting electrode disposed in position to be magnetized by the field of said transformer, a movable electrode, and means for relatively moving the electrodes to effect a welding operation upon an interposed work piece, the combination of non-magnetizable work feeding means terminating within the effective field of said magnetizable electrode for delivering magnetizable work pieces thereto, whereby "freezing" of the work pieces to the feeder is prevented, work lifting means for separating the welded work pieces from the magnetizable electrode, and means for operating the work lifting means after each welding operation.

10. In a welding machine having relatively movable electrodes to which work is fed, means for relatively moving the electrodes, the combination of a work feeding means to feed the work between said electrodes upon each separation thereof, a crankshaft for reciprocating the work feeding means, a work lifter arranged alongside of the work feeding means, and a trip between said shaft and work lifter to operate the latter.

11. In a welding machine having relatively movable electrodes to which work is fed, means for relatively moving the electrodes, the combination of a work feeding means to feed work between said electrodes upon each separation thereof, a crankshaft for reciprocating the work feeding means, a work lifter pivoted between its ends, a pawl pivoted to one end of the lifter, and a trip on said shaft to operate the lifter after each separation of the electrodes.

WILLIAM E. SMITH.